United States Patent
Ohno et al.

(10) Patent No.: US 6,937,208 B2
(45) Date of Patent: Aug. 30, 2005

(54) ANTENNA AND METHOD FOR MANUFACTURING THE SAME

(75) Inventors: Sadao Ohno, Gunma (JP); Shigenobu Kasagami, Saitama (JP)

(73) Assignee: Yokowo Co., Ltd., Tokyo (JP)

( * ) Notice: Subject to any disclaimer, the term of this patent is extended or adjusted under 35 U.S.C. 154(b) by 0 days.

(21) Appl. No.: 10/718,560

(22) Filed: Nov. 24, 2003

(65) Prior Publication Data
US 2004/0100417 A1 May 27, 2004

(30) Foreign Application Priority Data

Nov. 25, 2002 (JP) ........................................ P2002-341360

(51) Int. Cl.$^7$ .............................. H01Q 1/36; H01Q 1/42
(52) U.S. Cl. ...................... 343/895; 343/872; 343/873; 343/702
(58) Field of Search ................................. 343/895, 986, 343/700 MS, 702, 872, 873; 29/600; H01Q 1/36, 1/42

(56) References Cited

FOREIGN PATENT DOCUMENTS

JP 2000-252733 * 9/2000 ............ H01Q/1/40

* cited by examiner

Primary Examiner—Trinh Vo Dinh
(74) Attorney, Agent, or Firm—Morgan, Lewis & Bockius LLP

(57) ABSTRACT

An antenna element is placed in a first mold for molding a first resin member including a plurality of protrusions, formed on an outer peripheral face of the first resin member and arranged with a fixed interval relative to a circumferential direction of the first resin member, and a tip end portion, having a cross sectional shape in which projected portions are arranged with a fixed interval relative to the circumferential direction of the first resin member. Insulating resin is injected into the first mold to form the first resin member. The first resin member is placed in a second mold such that the protrusions are brought into contact with an inner face of the second mold. Insulating resin is injected into the second mold from a gate confronting the tip end portion of the first resin member, to form a second resin member coated on the first resin member.

6 Claims, 5 Drawing Sheets

ANTENNA AND METHOD FOR MANUFACTURING THE SAME

BACKGROUND OF THE INVENTION

The present invention relates to an antenna using an antenna element formed from a helical coil or the like, and a method for manufacturing such an antenna.

Antennas using antenna elements formed from helical coils etc. are generally used as ones for automobile use or for cellular phone use. In such an antenna, a change in pitch of a helical coil or the like results in a change in its antenna characteristic. In order to retain a constant antenna characteristic, the shape of the helical coil has to be fixed to prevent its pitch or the like from being changed.

Japanese Patent Publication No. 2000-252733A discloses an antenna element formed of a helical coil is first inserted into a mold, and the outer circumference of the antenna element is brought into contact with the inner surface of the mold so as to be placed at a predetermined position therein. Then, insulating resin is injected into the mold so as to mold a resin molded member integrally with the antenna element.

Here, a plurality of recess portions having a predetermined depth are formed in the inner surface of the mold in advance so that protrusions having a predetermined height are formed on the outer circumferential surface of the resin molded member integrally therewith. The pitch of the antenna element is fixed by the resin molded member, and the shape of the antenna element is prevented from being deformed. Thus, the antenna characteristic is stabilized. The outer circumference of the antenna element is exposed from the outer circumferential surface of the resin molded member.

Therefore, the resin molded member is inserted into another mold, and the tips of the predetermined-height protrusions provided in the outer circumferential surface of the resin molded member are brought into contact with the inner surface of the mold so as to be placed at a predetermined position therein. Then, insulating resin is injected into the mold so that a resin coating having a thickness equal to the height of the protrusions is molded integrally with the resin molded member so as to cover the resin molded member with the resin coating. The antenna element is covered with the resin coating so that the outside of the antenna element is electrically insulated, while the antenna element is prevented from being exposed to the atmosphere in order not to be rusted.

In the above manufacturing method, the resin is injected into the mold for forming the resin coating, at a center part of the antenna in a longitudinal (axial) direction thereof. The injecting direction is substantially perpendicular to the axial direction of the antenna. In a case where the injection pressure of the resin is too high, the lateral injection force strongly acts on the resin molded member so that the resin molded member is apt to be out of its proper position in the mold because the protrusions provided in the outer circumferential surface of the resin molded member cannot bear the injection force. As a result, the resin molded member is not coated with the resin coating by a predetermined thickness. On the contrary, in a case where the injection pressure of the resin is too low, the resin cannot reach every part of the mold satisfactorily. As a result, a sink is apt to be formed in the resin coating so that a large thickness variation is occurred in the resin coating.

In a case where the resin is injected into the mold from the tip end side of the antenna, there is a tendency that the injected resin does not flow uniformly over the outer circumference of the tip end portion of the resin molded member. Then, the resin on the side where most of resin flowed presses the tip end portion of the resin molded member to the opposite side. As a result, the resin molded member can not retain its proper position in the mold, so that a large thickness variation is occurred in the resin coating.

SUMMARY OF THE INVENTION

It is therefore an object of the invention to provide an antenna in which no thickness variation is occurred in a resin coating, and a method of manufacturing such an antenna.

In order to achieve the above object, according to the invention, there is provided an antenna, comprising:
an antenna element;
a first resin member, integrally molded with the antenna element, the first resin member including:
   a plurality of protrusions, formed on an outer peripheral face of the first resin member and arranged with a fixed interval relative to a circumferential direction of the first resin member; and
   a tip end portion, having a cross sectional shape in which projected portions are arranged with a fixed interval relative to the circumferential direction of the first resin member; and
a second resin member, coated on the first resin member so as to have a thickness substantially identical with a height of each of the protrusions.

Preferably, the tip end portion of the first resin member is shaped into a prismoid having conical faces facing directions at which the protrusions are arranged.

Alternatively, the tip end portion of the first resin member may be shaped into a pyramid having conical faces facing directions at which the protrusions are arranged.

According to the invention, there is also provided a method of manufacturing an antenna, comprising steps of:
providing an antenna element;
placing the antenna element in a first mold for molding a first resin member including:
   a plurality of protrusions, formed on an outer peripheral face of the first resin member and arranged with a fixed interval relative to a circumferential direction of the first resin member; and
   a tip end portion, having a cross sectional shape in which projected portions are arranged with a fixed interval relative to the circumferential direction of the first resin member;
injecting insulating resin into the first mold to form the first resin member;
placing the first resin member in a second mold such that the protrusions are brought into contact with an inner face of the second mold; and
injecting insulating resin into the second mold from a gate confronting the tip end portion of the first resin member, to form a second resin member coated on the first resin member.

Preferably, the first mold is configured such that the tip end portion of the first resin member is shaped into a prismoid having conical faces facing directions at which the protrusions are arranged.

Alternatively, the first mold may be configured such that the tip end portion of the first resin member is shaped into a pyramid having conical faces facing directions at which the protrusions are arranged.

According to the above configurations, the insulating resin injected into the second mold is equally divided to flow into the second mold by the tip end portion of the first resin member, so that the injected resin uniformly flows over the outer periphery of the first resin member. Accordingly, there is no probability that the first resin member is displaced in the second mold. As a result, the second resin member can be coated on the first resin member with a uniform thickness.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE INVENTION

Preferred embodiments of the invention will be described below in detail with reference to the accompanying drawings.

Figure 1:
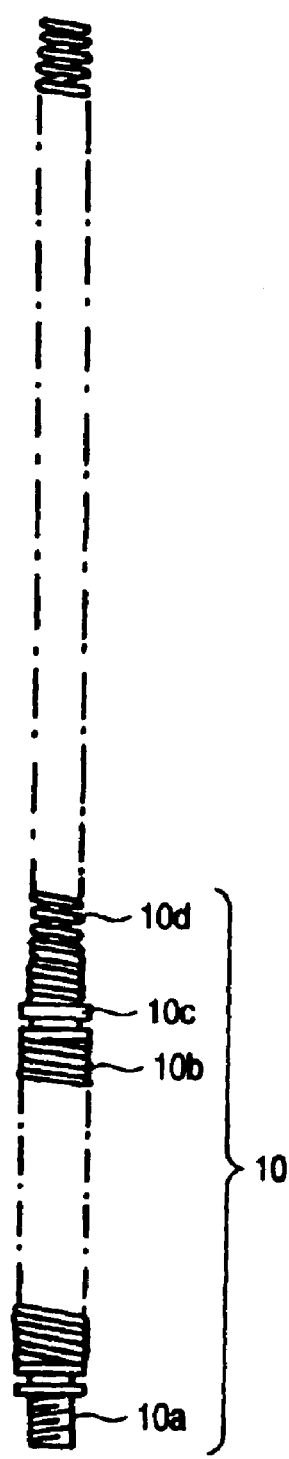
FIG. 1 is a side view showing an antenna element incorporated in an antenna according to one embodiment of the invention.

As shown in FIG. 1, an antenna element 10 comprises: an attachment screw 10a at the base end; a spring portion 10b of solid coiling provided on the attachment screw 10a; a connection fitting 10c; and a helical coil element 10d provided at the tip of the spring portion 10b through the connection fitting 10c. The attachment screw 10a, the spring portion 10b, the connection fitting 10c and the helical coil element 10d are electrically connected to operate as an antenna as a whole.

Figure 2:
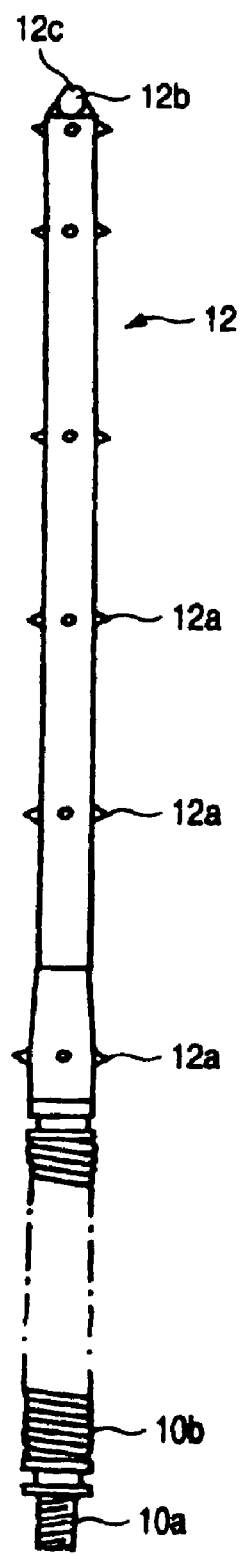
FIG. 2 is a side view showing a resin molded member integrally molded with the antenna element.
Figure 3:
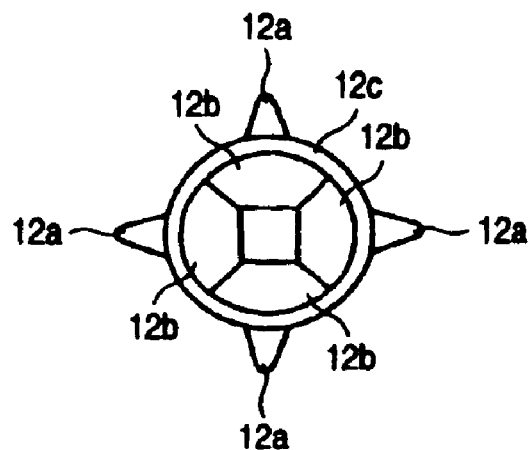
FIG. 3 is a plan view of a tip end portion of the resin molded member.

The portion of the antenna element 10 corresponding to the connection fitting 10c and the helical coil element 10d is inserted into a not-shown mold for molding a resin molded member. The outer circumference of the helical coil element 10d is brought into contact with the inner surface of the mold so as to be placed at a predetermined position therein. Insulating resin is injected into the mold so that a resin molded member 12 is molded integrally with the antenna element 10, as shown in FIG. 2. Incidentally, a plurality of protrusions 12a having a predetermined height are arranged on the outer circumferential face of the resin molded member 12 at a fixed interval in a circumferential direction thereof. In this embodiment, four protrusions 12a are provided to form one set of the protrusions as shown in FIG. 3. A plurality sets of the protrusions are arranged in the axial direction of the antenna element 10.

Figure 4:
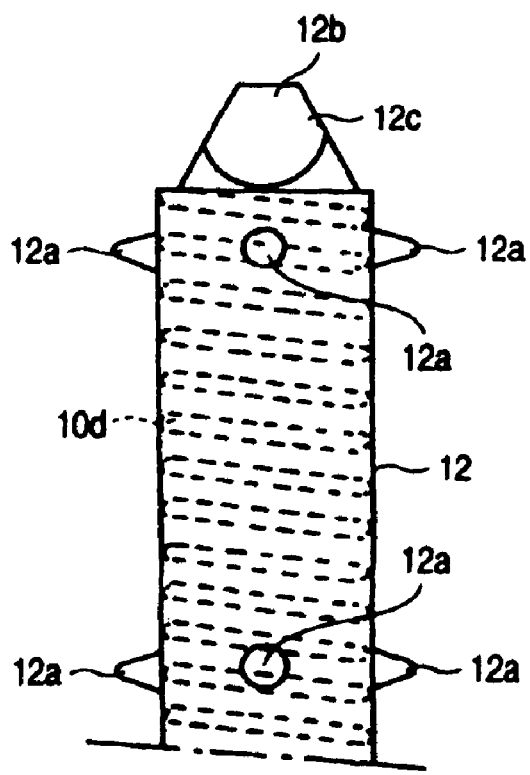
FIG. 4 is an enlarged side view of the tip end portion of the resin molded member.

Further, as shown in FIGS. 3 and 4, the tip end portion of the resin molded member 12 is formed into a quadrangular prismoid 12c whose conical faces 12b face the directions at which the protrusions 12a are arranged. The quadrangular prismoid 12c is molded integrally by a quadrangular prismoid concave provided in a tip end portion of the mold for molding the resin molded member, in the same manner as the protrusions 12a are molded.

Figure 5:
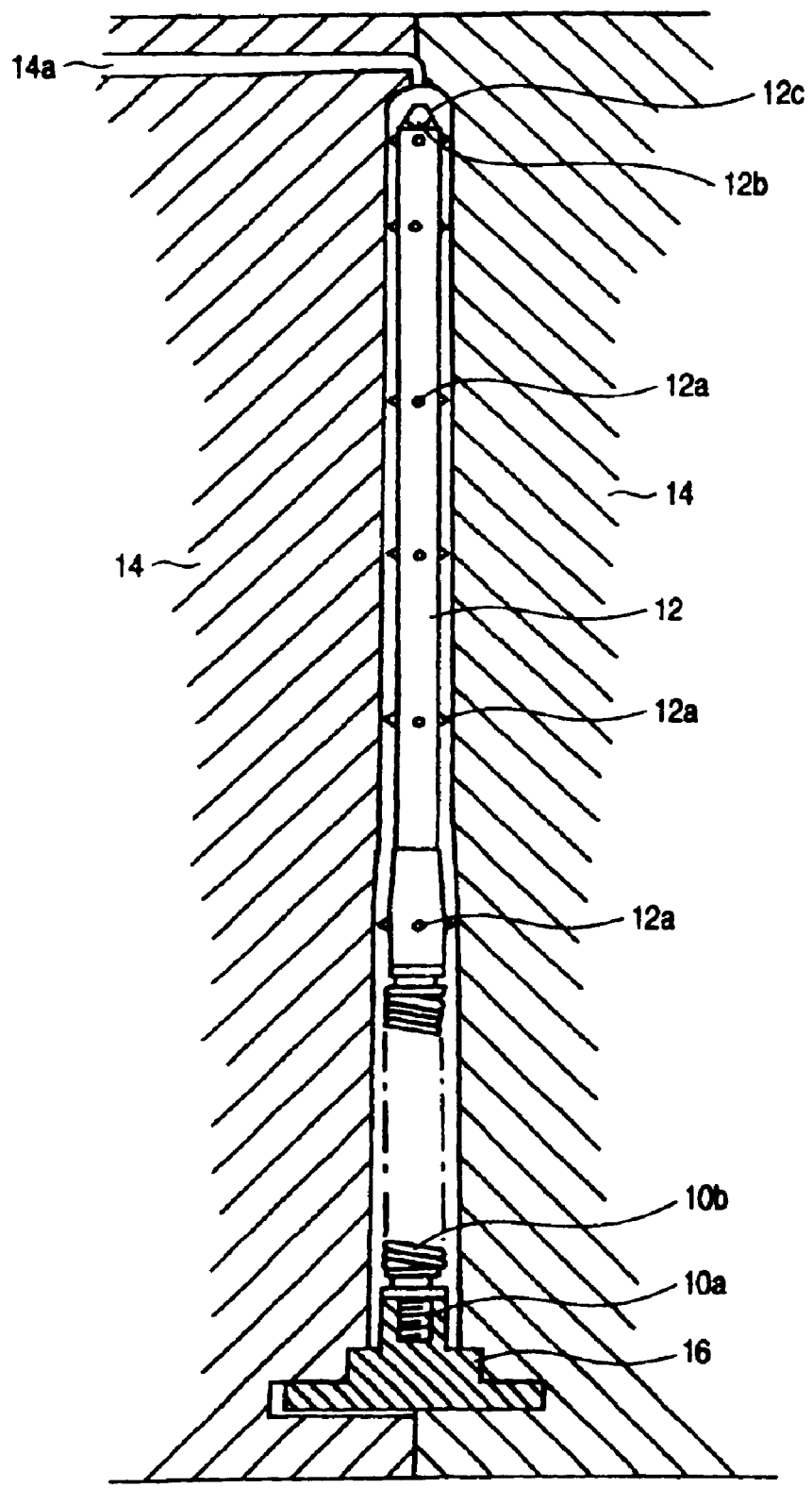
FIG. 5 is a section view showing a mold for forming a resin coating on the resin molded member.

Further, the whole of the thus configured resin molded member 12 is inserted between molds 14 for forming a resin coating as shown in FIG. 5. The attachment screw 10a is screwed down to a fixed insert 16, and the fixed insert 16 is fixed suitably to the molds 14. Then, the tips of the protrusions 12a of the resin molded member 12 are brought into contact with the inner surfaces of the molds 14 so as to be placed at a predetermined position therein. In the molds 14, a liner 14a is opened on the tip end side of the antenna so that insulating resin is injected into the molds 14 from the tip end side of the antenna.

Figure 6:
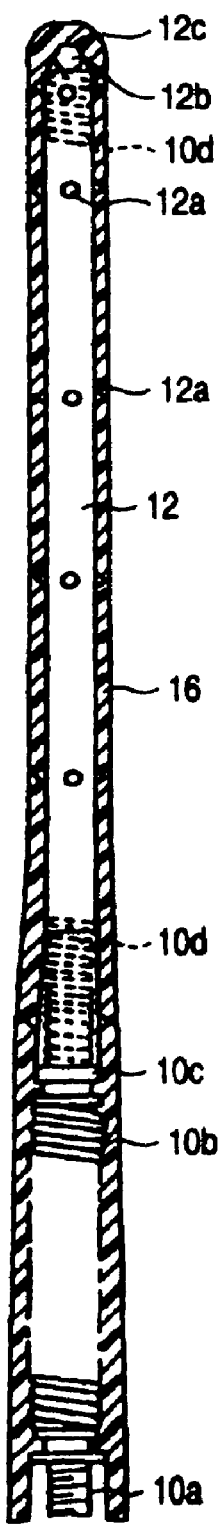
FIG. 6 is an explanatory section view showing the antenna.
Figure 7A:
FIG. 7A is a plan view of a first modified example of the tip end portion of the resin molded member.
Figure 7B:
FIG. 7B is a side view of the resin molded member of FIG. 7A.
Figure 7C:
FIG. 7C is a plan view of a second modified example of the tip end portion of the resin molded member.
Figure 7D:
FIG. 7D is a side view of the resin molded member of FIG. 7C.
Figure 7E:
FIG. 7E is a plan view of a third modified example of the tip end portion of the resin molded member.
Figure 7F:
FIG. 7F is a side view of the resin molded member of FIG. 7E.

The injected resin is equally divided into four by the ridges of the quadrangular prismoid 12c, and further guided toward the base end of the antenna along the conical faces 12b. As a result, the injected resin flows substantially uniformly over the outer circumference of the tip end portion of the resin molded member 12, and flows substantially uniformly all over the outer circumference of the resin molded member 12 including the spring portion 10b and the connection fitting 10c. Thus, a resin coating 16 is molded integrally so as to have a thickness equal to the predetermined height of the protrusions 12a as shown in FIG. 6.

Due to the insulating resin injected into the molds 14 from the tip end side, a pressure acts on the resin molded member 12 in its axial direction toward its base end. Therefore, the compressing force acts on the spring portion 10b so that there occurs no gap in the spring portion 10b. As a result, there is no probability that the insulating resin flowing around the spring portion 10b invades the inside of the spring portion 10b. Thus, the elasticity of the spring portion 10b for regulating the attitude of the antenna element 10 can be maintained.

The shape of the tip end portion of the resin molded member 12 may not be the quadrangular prismoid 12c so long as the injected insulating resin can be equally divided and can be uniformly flowed over the outer circumference of the resin molded member 12. For example, ribs may be formed with fixed intervals in the circumferential direction of the tip end portion. Further, the cross sectional shape of the tip end portion may be changed so long as ridge portions are arranged with fixed intervals in the circumferential direction of the tip end portion. For example, in order to make the injected resin flow smooth, each portion between the ridges may be curved inward.

Further, as shown in FIGS. 7A to 7F, the tip end portion of the resin molded member 12 may be formed into a quadrangular pyramid, a triangular pyramid or a pentagonal pyramid. The conical faces 12b of the prismoid or pyramid may not face the directions at which the protrusions 12a are arranged. The conical faces 12b may face the directions where are between the protrusions 12a in the circumferential direction of the resin molded member 12, so long as the injected insulating resin can be equally divided and can be uniformly flowed over the outer circumference of the resin molded member 12.

The embodiment is designed for an automobile antenna capable of being elastically deformed at the spring portion 10*b* when lateral external force acts on the antenna. If it is not necessary for the antenna to be elastically deformed in accordance with external force acting thereon, the helical coil element 10*d* may be provided directly on the attachment screw 10*a*. Incidentally, the insulating resin for molding the resin molded member 12 and the resin coating 16 has to be a material having proper elasticity to allow the antenna to be elastically deformed.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An antenna, comprising:
    an antenna element;
    a first resin member, integrally molded with the antenna element, the first resin member including:
    a cylindrical body;
    a plurality of protrusions, formed on an outer peripheral face of the cylindrical body and arranged with a fixed interval relative to a circumferential direction of the cylindrical body; and
    a guide member formed on one longitudinal end of the cylindrical body; and
    a second resin member, coated on the first resin member so as to have thickness substantially identical with a height of each of the protrusions, wherein:
    the guide member has an outer peripheral face including a plurality of ridges which are arranged with a fixed interval relative to a circumferential direction of the cylindrical body; and
    a cross section of the guide member becomes smaller toward a tip end thereof.

2. The antenna as set forth in claim 1, wherein the guide member is shaped into a prismoid having conical faces facing directions at which the protrusions are arranged.

3. The antenna as set forth in claim 1, wherein the guide member is shaped into a pyramid having conical faces facing directions at which the protrusions are arranged.

4. A method of manufacturing an antenna, comprising steps of:
    providing an antenna element;
    placing the antenna element in a first mold for molding a first resin member including:
    a plurality of protrusions, formed on an outer peripheral face of the first resin member and arranged with a fixed interval relative to a circumferential direction of the first resin member; and
    a tip end portion, having a cross sectional shape in which projected portions are arranged with a fixed interval relative to the circumferential direction of the first resin member;
    injecting insulating resin into the first mold to form the first resin member;
    placing the first resin member in a second mold such that the protrusions are brought into contact with an inner face of the second mold; and
    injecting insulating resin into the second mold from a gate confronting the tip end portion of the first resin member, to form a second resin member coated on the first resin member.

5. The manufacturing method as set forth in claim 4, wherein the first mold is configured such that the tip end portion of the first resin member is shaped into a prismoid having conical faces facing directions at which the protrusions are arranged.

6. The manufacturing method as set forth in claim 4, wherein the first mold is configured such that the tip end portion of the first resin member is shaped into pyramid having conical faces facing directions at which the protrusions are arranged.

* * * * *